United States Patent
Lauser

[11] Patent Number: 5,499,869
[45] Date of Patent: Mar. 19, 1996

[54] DEVICE FOR ADJUSTING THE PRESSURE OF THE PLASTIC MATERIAL IN A SCREW EXTRUDER

[75] Inventor: Wolfgang Lauser, Leonberg, Germany

[73] Assignee: Werner & Pfleiderer GmbH, Stuttgart, Germany

[21] Appl. No.: 320,454

[22] Filed: Oct. 11, 1994

[30] Foreign Application Priority Data

Oct. 11, 1993 [DE] Germany ............ 43 34 564.6

[51] Int. Cl.⁶ .................. B28C 7/16; B29C 37/00
[52] U.S. Cl. .................. 366/77; 366/87; 425/381; 425/446; 425/447
[58] Field of Search .................. 366/77, 83, 84, 366/85, 87, 184, 189, 194, 195, 176.1, 176.2, 176.3, 176.4; 425/466, 467, 381; 138/43, 45, 46

[56] References Cited

U.S. PATENT DOCUMENTS

| 1,540,209 | 6/1925 | Frazier . | |
| 1,585,149 | 5/1926 | Humphrey | 425/466 |
| 1,802,897 | 4/1931 | Holden et al. . | |
| 2,339,527 | 1/1944 | Thompson | 425/466 |
| 3,054,143 | 9/1962 | Stenger | 425/381 |
| 3,081,804 | 3/1963 | Koch | 366/194 |
| 3,346,918 | 10/1967 | Deluze et al. | 425/466 |
| 3,924,997 | 12/1975 | Kosinsky | 425/466 |
| 4,184,772 | 1/1980 | Meyer . | |
| 4,652,225 | 3/1987 | Dehennau et al. | 425/466 |

FOREIGN PATENT DOCUMENTS

| 0336752 | 10/1989 | European Pat. Off. . | |
| 1353967 | 1/1964 | France | 425/209 |
| 3414444 | 5/1985 | Germany | 425/466 |
| 57082032 | 11/1980 | Japan . | |
| 1082536 | 9/1967 | United Kingdom . | |

OTHER PUBLICATIONS

G. Schenkel, Kunststoff–Extrudertechnik, pp. 260–261, 1963.

Primary Examiner—David Scherbel
Assistant Examiner—Tony G. Soohoo
Attorney, Agent, or Firm—Ladas & Parry

[57] ABSTRACT

A throttle for the adjustment of the pressure of plastic material in screw extruders in which the throttle is a cylindrical plunger submerged in the melt flow in a melt channel. In order to eliminate dead spaces downstream of the throttle, the plunger is arranged in a symmetrical and displaceable manner in a rectangular melt channel and one or more through holes are provided in the plunger in the flow direction in the submerged region of the plunger.

8 Claims, 1 Drawing Sheet

DEVICE FOR ADJUSTING THE PRESSURE OF THE PLASTIC MATERIAL IN A SCREW EXTRUDER

FIELD OF THE INVENTION

The invention relates to a device for adjusting the pressure of plastic material being processed in a screw extruder.

BACKGROUND AND PRIOR ART

The arrangement of a throttle in the region of the melt channel at the outlet of a screw extruder is generally known, in order to achieve a pressure buildup in the extruder. Several structural types of throttles are known to constrict or to expand the cross-sectional area of the melt channel. Most throttles are relatively complicated technically and consist of several individual parts as, for example, shown in DE-AS 12 12 295.

A simple structural type consists of a plunger which can be shifted transversely relative to the flow of the melt as disclosed in G. Schenkel, Kunststoff-Extrudertechnik, p. 261, FIG. 6/54. A disadvantage of this construction is that the mass flow of the plastic melt is divided and flow "shadows" arise directly behind the plunger, so that parts of the molten plastic are deposited hereat and then may burn off or decompose.

SUMMARY OF THE INVENTION

An object of the invention is to provide a simple, construction for the throttle, in the form of a plunger, which avoids the disadvantages of the conventional plunger throttle.

The object is satisfied according to the invention by providing one or more holes through the plunger in the direction of flow of the plastic material. In this way, it is assured that a constant material flow on both sides of the plunger is provided, and dead spaces directly behind the plunger are reliably avoided by flow of the molten plastic material through the holes in the plunger.

In further accordance with the invention, the plunger is movably adjustable, continuously from outside the melt channel, whereby it is simultaneously assured that an improved free flushing of the dead spaces at the back of the plunger is produced even with increasing throttling of the melt. Preferably, the plunger is used in a rectangular melt channel of a twin screw extruder.

DETAILED DESCRIPTION OF A PREFERRED EMBODIMENT

Figure 2:
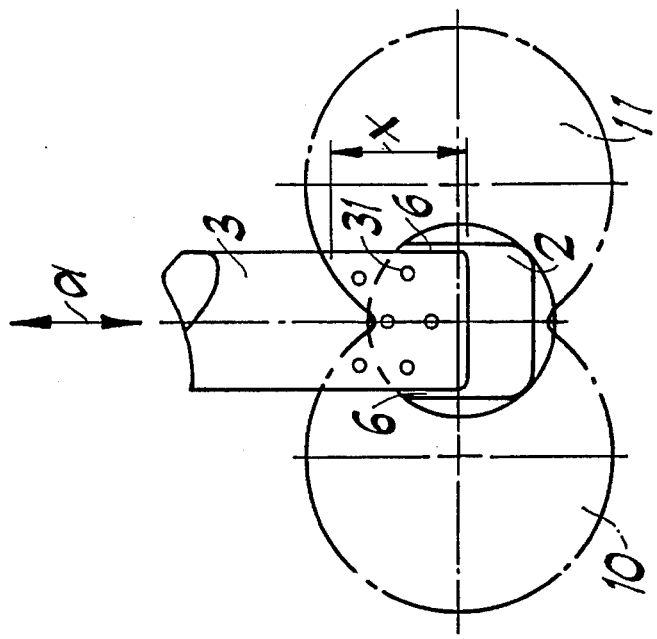
FIG. 2 shows on enlarged scale, a sectional view taken along line II—II in FIG. 1.

The drawing shows a discharge end of a twin screw melt extruder 1 in which at the discharge end, a rectangular melt channel 2 is formed with a throttle plunger 3 in the melt channel. The melt channel 2 receives molten plastic material from overlapped bores 10, 11 in which respective extruder screws 4, 5 are rotatably driven.

The plunger 3 is cylindrical and is supported so that it can be displaced in a continuous, stepless manner transversely to the melt flow in melt channel 2. Drive means (not shown) on the extruder housing serve to displace the plunger vertically. The drive means can be an electric motor or a hydraulic drive.

In a lower region X of the plunger to be submerged in the melt, the plunger is provided with several through holes 31, symmetrically arranged with respect to the longitudinal axis of the cylindrical plunger. The number and size of the holes 31 in submersion region X is a function of the type of product in the extruder. The plunger 3 is easily replaced to enable changing one plunger for another depending on the melt material.

The plunger 3 controls the pressure of the melt in the extruder and no dead spaces can occur behind the plunger, due to the through holes 31 in the plunger. Preferably, several through holes 31 are provided in the submersion region X of the plunger and the number and diameter of the holes 31 are adapted to the size of plunger 3 and the nature of the plastic product. The dimensions of plunger 3 with respect to rectangular melt channel 2 are selected to provide a small gap 6 at both sides of plunger 3 for a continuous flow of material at the sides of the melt channel 2.

Any arbitrary throttle position can be obtained for plunger 3 by a simple displacement in the direction of double arrow a in FIG. 2.

In addition to the throttle described for a twin-screw extruder as a drive throttle in the disclosed embodiment, the device of the invention may be used in all single or multi-shaft screw extruders for control of the pressure of the plastic melt.

Figure 1:
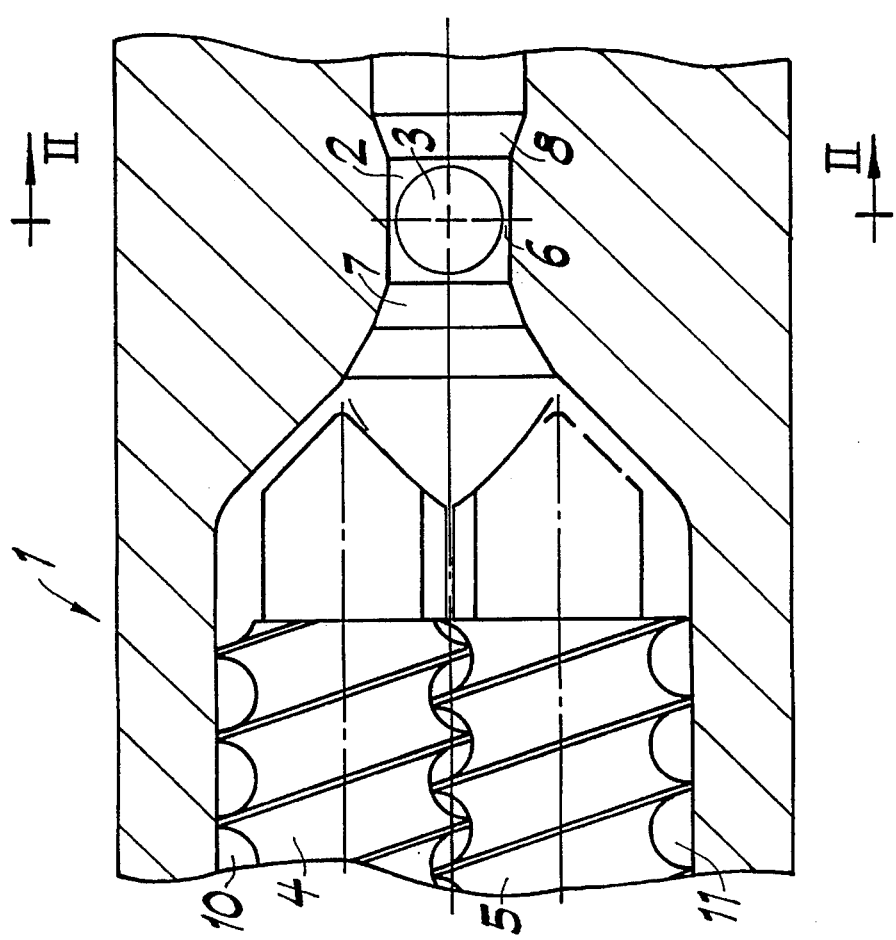
FIG. 1 is a sectional view from above, of the end of a twin-screw extruder with a rectangular melt channel.

In the drawing, the melt channel is rectangular and the plunger is cylindrical and symmetrically inscribed in the melt channel as shown in FIG. 1, the flat, lower end of the plunger projecting into the melt channel to reduce the cross-sectional area of the flow passage. Upstream and downstream of the melt channel 2, are tapered inlet and outlet portions 7, 8 respectively, for the melt. Tapered portion 7 is convergent and tapered portion 8 is divergent.

Although the invention has been described in relation to a specific embodiment thereof, it will become apparent to those skilled in the art that numerous modifications and variations can be made within the scope and spirit of the invention as defined in the attached claims.

What is claimed is:

1. Apparatus for adjusting the pressure of plastic material in an extruder comprising a melt channel at an outlet of the extruder for discharge of plastic material received from the extruder, said melt channel having a rectangular cross-section, and a plunger transversely and symmetrically disposed in said melt channel to block off part of the melt channel and form a flow passage for the plastic material between an end of the plunger and the remainder of the melt channel, said plunger being cylindrical and movable transversely in said melt channel to vary said flow passage, and thereby vary pressure of the plastic material in the extruder, said plunger being provided with at least one hole extending transversely through said plunger in the direction of flow of said plastic material for flow of said plastic material through said at least one hole in addition to the flow of the plastic material through said flow passage.

2. Apparatus as claimed in claim 1, wherein said plunger includes a region in said melt channel submerged in the plastic material, said at least one hole being provided in said region.

3. Apparatus as claimed in claim 2, wherein a plurality of holes pass through said plunger, said holes being symmetrically arranged in said region of the plunger.

4. Apparatus as claimed in claim 1, wherein said plunger has a peripheral surface forming a clearance space with opposite side surfaces of said melt channel.

5. Apparatus as claimed in claim 4, wherein the clearance spaces at the opposite side surfaces of the melt channel are substantially equal.

6. Apparatus as claimed in claim 5, comprising tapered inlet and outlet portions extending from said melt channel at opposite ends of the melt channel, respectively for supplying plastic material to the melt channel and for removal of plastic material from said melt channel.

7. Apparatus as claimed in claim 6, wherein the tapered inlet portion is convergent from the melt channel and the tapered outlet portion is divergent from the melt channel.

8. Apparatus as claimed in claim 1, wherein said plunger is movable vertically and said melt channel extends horizontally.

* * * * *